(12) United States Patent
Khan (10) Patent No.: US 9,552,430 B1
(45) Date of Patent: Jan. 24, 2017

(54) IDENTIFYING RESOURCE LOCATIONS

(75) Inventor: Rehan Khan, Lafayette, CA (US)

(73) Assignee: GOOGLE INC., Mountain View, CA (US)

( * ) Notice: Subject to any disclaimer, the term of this patent is extended or adjusted under 35 U.S.C. 154(b) by 632 days.

(21) Appl. No.: 12/979,506

(22) Filed: Dec. 28, 2010

(51) Int. Cl.
*G06F 7/00* (2006.01)
*G06F 17/30* (2006.01)

(52) U.S. Cl.
CPC ................... *G06F 17/3087* (2013.01)

(58) Field of Classification Search
CPC ............................... G06F 17/30554
USPC ............................... 707/751, 724
See application file for complete search history.

(56) References Cited

U.S. PATENT DOCUMENTS

| | | | |
|---|---|---|---|
| 7,616,964 B2 | 11/2009 | Riise et al. | |
| 7,668,832 B2 | 2/2010 | Yeh et al. | |
| 7,680,796 B2 | 3/2010 | Yeh et al. | |
| 7,778,872 B2 | 8/2010 | Kamangar et al. | |
| 7,788,260 B2 | 8/2010 | Lunt et al. | |
| 2002/0099605 A1 | 7/2002 | Weitzman et al. | |
| 2005/0125397 A1 | 6/2005 | Gross et al. | |
| 2005/0154718 A1 | 7/2005 | Payne et al. | |
| 2006/0200490 A1 | 9/2006 | Abbiss | |
| 2007/0005587 A1* | 1/2007 | Johnson | G06F 17/3053 |
| 2008/0086264 A1* | 4/2008 | Fisher | G01C 21/30 701/533 |
| 2009/0271371 A1* | 10/2009 | Levin | G06F 17/30241 |
| 2010/0004997 A1* | 1/2010 | Mehta | G06Q 30/02 705/14.66 |
| 2010/0174703 A1 | 7/2010 | Dandekar et al. | |
| 2011/0010336 A1* | 1/2011 | Johnson | G06F 17/3087 707/609 |
| 2011/0035384 A1* | 2/2011 | Qiu | G06Q 10/107 707/748 |
| 2011/0090080 A1* | 4/2011 | Yu | G06Q 30/0201 340/539.13 |
| 2011/0238643 A1 | 9/2011 | Tong et al. | |
| 2011/0264651 A1 | 10/2011 | Selvaraj et al. | |
| 2012/0030152 A1 | 2/2012 | Pueyo et al. | |

* cited by examiner

*Primary Examiner* — Van Oberly
(74) *Attorney, Agent, or Firm* — Marshall, Gerstein & Borun LLP (57) ABSTRACT

Methods, systems, and apparatus, including computer programs encoded on a computer storage medium, for identifying resource locations. In one aspect, a method includes determining a resource location for a resource from user locations associated with users who performed actions identified as having represented user interest in the resource.

2 Claims, 4 Drawing Sheets

IDENTIFYING RESOURCE LOCATIONS

BACKGROUND

This specification relates to identifying a location relevant to resources indexed by a search engine.

Search engines, such as Internet search engines, identify resources, e.g. Web pages, images, text documents, and multimedia files, in response to queries submitted by users and present information about the resources in a manner that is useful to the users.

Users of search engines are often interested in information specific to the users' locations. For example, users may want to know the local weather, or may be interested in local politics or sports. Some topics which are interesting to users of one location may be less interesting to users in a different location.

A search engine allows a user to provide a query for which search results are returned in response. Some search engines can associate a location with a resource based on content of the resource, e.g., an address.

SUMMARY

In general, one innovative aspect of the subject matter described in this specification can be embodied in methods that include the actions of determining a resource location for a resource from user locations associated with users who performed actions identified as having represented user interest in the resource. Other embodiments of this aspect include corresponding systems, apparatus, and computer programs, configured to perform the actions of the methods, encoded on computer storage devices.

These and other embodiments can each optionally include one or more of the following features. The actions that expressed interest in the resource may include selecting the resource from a plurality of resources provided as search results in response to a query submitted to a search engine. Determining the resource location may include identifying a plurality of actions, each performed by a user, wherein each action is identified as having represented user interest in the resource, determining a plurality of user locations from the plurality of actions by determining for each action a location associated with a user who performed the action, calculating a distribution of the locations; and determining the resource location using the distribution of the locations. Each user location may be determined based on one or more of an IP Address of a client device, a location stored in a user session, a query history, or a location of a client device. Determining the resource location may include determining a confidence factor for each expression of interest of the user and calculating the distribution of the locations comprises weighting the location of the user based on the confidence factor. Each user location may be represented by a longitude and a latitude. Each user location may be represented by a zip postal code.

Particular embodiments of the subject matter described in this specification can be implemented so as to realize one or more of the following advantages: local resources may be identified, search results may be tailored to users based on location. Publishers of web pages can understand the geographical distribution of their viewers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
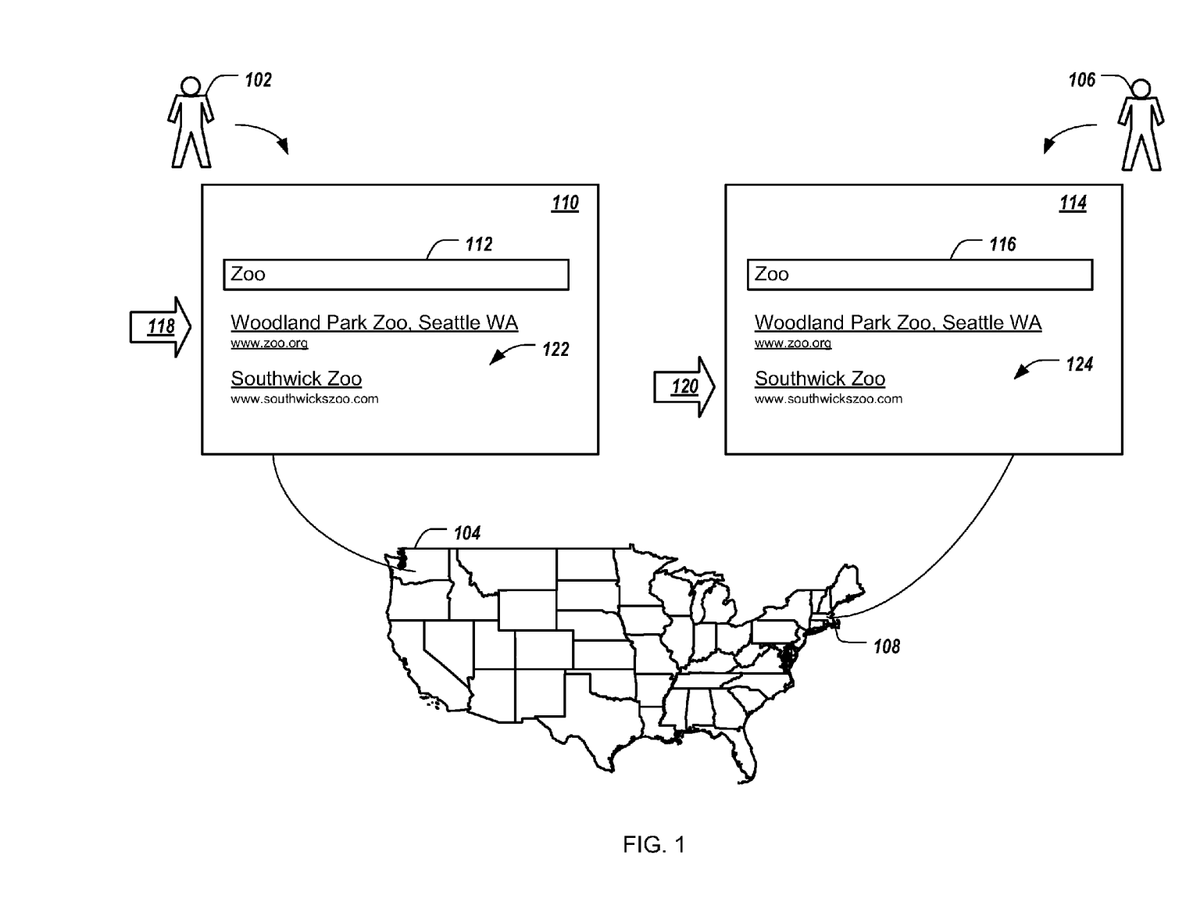
FIG. 1 is a block diagram illustrating example users performing the same search from different locations.

FIG. 1 is a block diagram illustrating example users performing the same search from different locations. A user 102, located in Washington 104, enters a search query "Zoo" 112 into a search interface 110 of a search engine. In response to the search query, the user 102 is provided with a list of search results 122. Similarly, another user 106, located in Massachusetts 108, enters a search query "Zoo" 116 into a search interface 114 of the same search engine. In response to the search query, the search engine provides a list of search results 124 to the user 106. Each of the search results provides information about a resource, including a link to the resource.

In this example, the search results 122, 124 each contain search results for the Woodland Park Zoo in Seattle, Wash. and the Southwick Zoo in Mendon, Mass.

Generally, the user 102 located in Washington, is more likely to be interested in the Woodland Park Zoo than the Southwick Zoo, and the user 106 in Massachusetts is more likely to be interested in the Southwick Zoo than the Woodland Park Zoo. As represented by arrow 118, the user 102 in Washington selects the Woodland Park search result. Similarly, as represented by arrow 120, the user 106 in Massachusetts selects the Southwick Zoo search result.

As described below, a search system can associate a location with a resource using information about the locations of users who expresses interest in search results that refer to the resource, for example by selecting the resource. Data associating locations with resources can be used in generating responses to subsequent searches submitted by subsequent users to improve the quality of the search results provided to the users.

Figure 2:
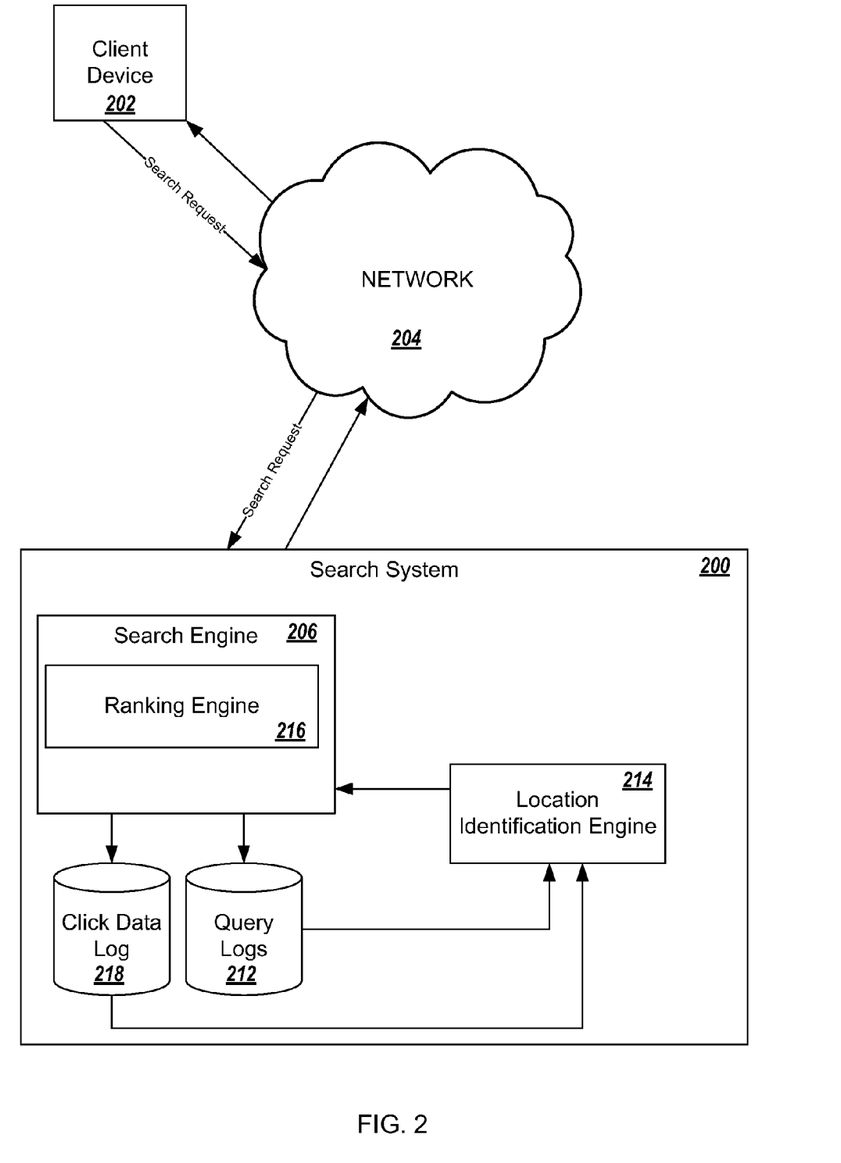
FIG. 2 illustrates an example Internet search system that can use location information as will be described in this specification.

FIG. 2 illustrates an example Internet search system 200 that can use location information as will be described in this specification. The search system receives search requests and responds with search results identifying Internet-addressable resources responsive to the requests. The resources can be, for example, web pages, text documents, PDF (portable document format) documents, images or videos. In general, a search request is generated on a client device 202, e.g., a personal computer or a smart phone, when a user of the device enters a search query in a search interface. Commonly, the search interface is provided in the form of a web page that is received from the search system and displayed on a display of the user device by a program, e.g., a web browser, running on the device. The client device and the search system communicate over a data communication network 204. The network can include the Internet and, for example, one or more cellular telephones, local area or wide area networks. The search request sent to the search system includes the search query and, generally, other information, including information about the user device including, in some cases, information about the geographic location of the device, e.g., GPS (global positioning system) coordinates.

The search system maintains a log of click data 218 that associates user selections of search results 212 (i.e., selection of resources) with the associated queries and location information about the user or user device or both. From the click data, the system can determine a length of time a user spent viewing a selected resource and categorize the associated click on the search result as a long click, which can be taken as indicating user interest in the resource, or a short click, can be taken as indicating a lack of user interest in the resource.

A user enters a query in a client device 202. The client device sends a search request that includes the query over a network 204 to a search engine 206. The search engine associates the user with a location based on information provided in the request or otherwise provided by the client device. For example, a location identification engine 214 may determine a location of the user based on the Internet Protocol Address of the client device, or the location identification engine may determine a location of the user based on GPS coordinates provided by the client device.

In some implementations, a location of the user may be determined based on location information provided from a cellular service provider. For example, the cellular service provider can provide a location of a cellular communications tower to which the request was transmitted from the client device.

In some implementations, the location identification engine can use information in a query log 212 describing interactions between the client device, or a user of the client device, and the search system to determine a location of the user.

In some implementations, the search system can identify a location of the user through the use of cookies or other state-preserving techniques over a short session or over longer periods of time. For example, the query log may indicate the user had previously searched for "Palo Alto High School" and, since users in other locations are unlikely to search for "Palo Alto High School," determine that the user is most likely in or near Palo Alto. In some scenarios, a single query in the log may not be sufficient to unambiguously determine a location. A user searching for "Fremont High School" may be either from Sunnyvale, Calif. or Los Angeles, Calif. The location identification engine may rely on multiple recent queries to determine a location.

Once a location is identified, the location identification engine provides the location of the user to a ranking engine 216.

The search engine identifies search results that are responsive to the query. The ranking engine ranks the search results so that resources determined to be best are presented first. Using conventional techniques, the ranking engine ranks resources using information associated with the resource, including location information. Conventional systems identify a location of a resource by analyzing the resource itself, for example, by examining the resource for address and telephone numbers.

The search system returns the ranked search results to the client device in a response to the search request. The user of the client device may select one or more of the search results. The selection of the search result is communicated to the search engine.

The search engine stores the location of the user at the time the search result is selected, as a selection location in a click data log 218 on the search system. The location identification engine 214 determines locations to associate with resources based on the selection locations referencing the resource.

In some implementations, a location associated with the resource is defined by a central point and a dispersion, for example a statistical dispersion. Generally, as described below, the dispersion defines an area where the resource is most frequently selected. In some implementations, resources which have a relatively small dispersion, that is, resources which have the majority of their selections in a relatively concentrated area, are designated as local resources.

In some implementations, locations associated with a resource are determined by the location identification engine and a location of the user is used by the ranking engine to adjust scores associated with the search results. A score of a resource can be increased by an amount determined by the location of the user and a location of the resource. For example, the ranking engine increases the score of the resource by a predetermined amount when the location of the user is within an area defined by the location of the resource. Alternatively, the ranking engine may increase the score of the resource based on the distance between the location of the user and the location of the resource. In some implementations, the score may be decreased when the location of the user is outside an area defined by the location of the resource. In some implementations, scores are increased or decreased only when the resource is determined to be a local resource. A local resource is a resource that is particularly relevant to a small geographical area. For example, a local resource may be defined to be a resource where a radius of a dispersion associated with the location of the resource is less than a threshold (for example, 25 miles, 50 miles, or 100 miles).

Figure 3A:
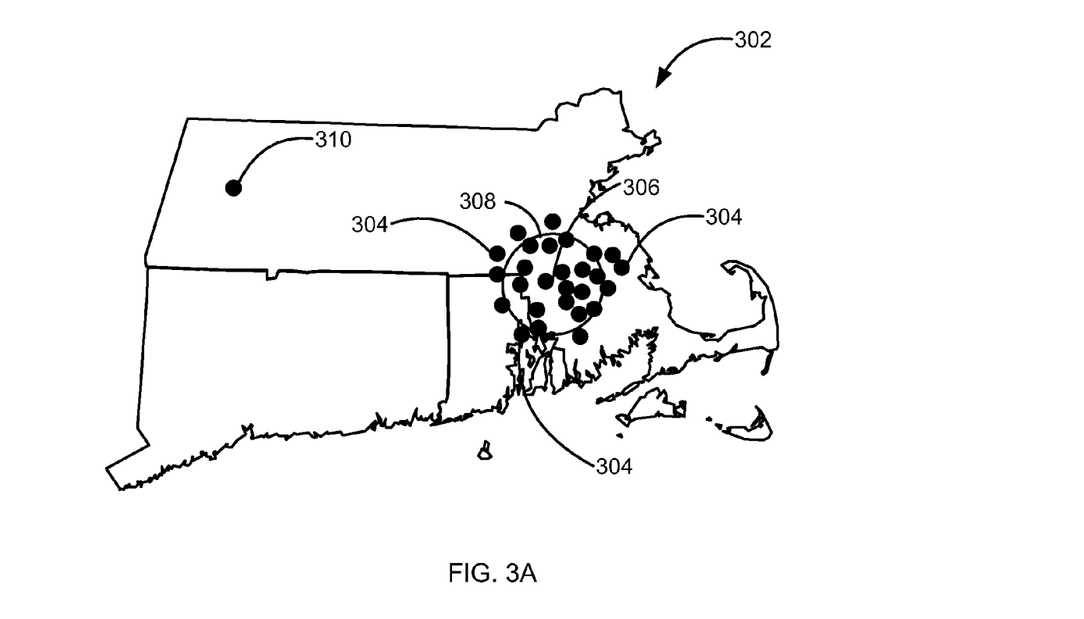
FIG. 3A illustrates an example of a determining a location for a resource based on selection locations.

FIG. 3A illustrates an example of a determining a location for a resource based on selection locations. The geographical area for a resource is determined from an analysis of historical corresponding selection locations. A geographic area 302 is shown, here, the state of Massachusetts, Rhode Island and Connecticut. The geographic area analysis is not limited to states, countries, or any particular geopolitical boundary. Within an area a number of selection locations, representing locations where users expressed interest in the resource, are tracked, represented as the black dots 304. For some implementations, using conventional methods of spatial distribution analysis, areas where a particular resource is popular may be identified. In some implementations, selection locations 310 that represent statistical outliers, far from other users who selected the resource, are excluded from the analysis.

A center 306 is determined. The center may be identified using longitude and latitude coordinates. In some implementations, the center is the mean center of the distribution of selection locations. From the center, a dispersion is determined, represented by the circle 312. The dispersion represents an area in which the resource is most frequently selected. In some implementations, the dispersion is defined by a standard deviation of the distance from the mean center. In general, the smaller an area of dispersion the more localized the interest in the resource, the larger the area of dispersion the less localized the interest in the resource.

Figure 3B:
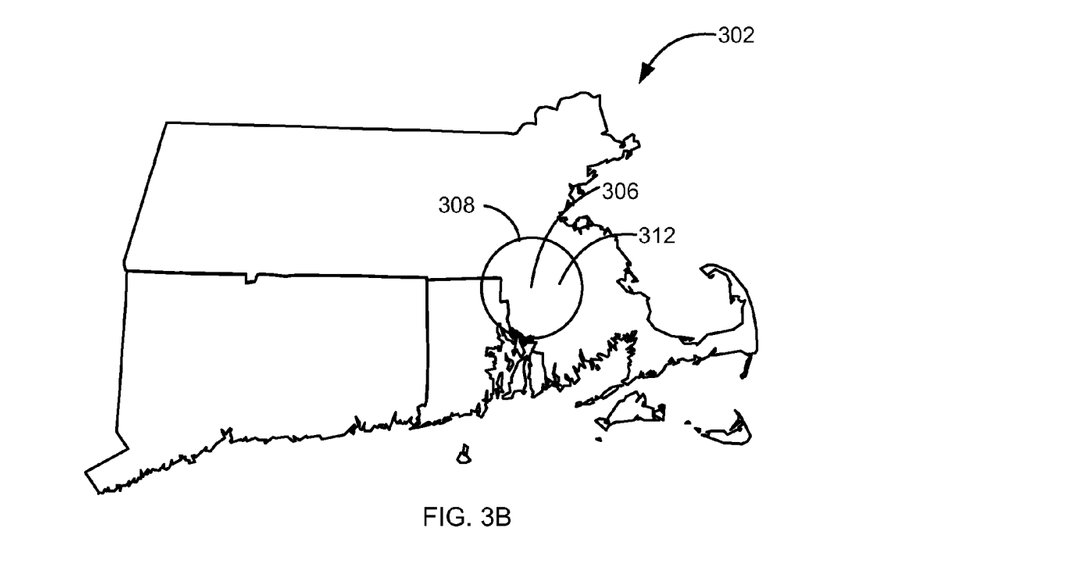
FIG. 3B illustrates an example of determining popularity of a resource at a location.

FIG. 3B illustrates an example of determining popularity of a resource at a location. In FIG. 3B, the popularity of the resource (as measured by the number of result selections corresponding to that resource in the area) at a given location of a user 312 may be defined by the number of result selections and the distance between the location 312 and the center 306. In general, how popular the resource is determined to be depends on the distance between the location of the user 312 and the central location 306 as well as how quickly the resource's popularity disperses (e.g. the size of the dispersion area 306). Any conventional distribution function may be used to determine the popularity of the resource at a given point based on spatial probability distributions. For example, an isotropic Gaussian distribution, a bivariate Gaussian distribution, or other conventional cumulative distribution functions may be used. In other implementations, mixtures of Gaussians or other distribution functions, wavelets, or polygons, or any other method of representing a spatial distribution may be used. In some implementations, the popularity of the resource at a location is used to adjust the ranking of a search result referencing the resource.

Figure 4:
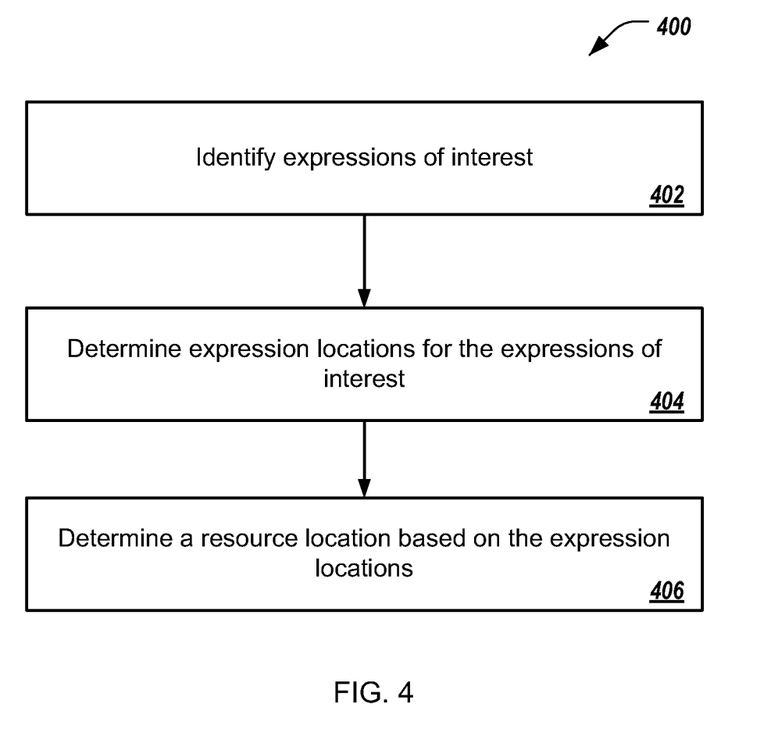
FIG. 4 is a flowchart that represents operations of a process that determines a location for a resource.

FIG. 4 is a flowchart that represents operations of a process that determines a location for a resource. For convenience, the operations will be described with reference to a system that performs the operations. The system can be, for example, the search system 200 including the location identification engine 214 described in reference to FIG. 2.

The process identifies expressions of interest in a resource (402). In a search environment, one way to identify that a user expresses interest in a resource is that the user selects a search result which corresponds to the resource. In some implementations, the process requires the identification of a minimum number of users who expressed interest before determining a location for a resource, as described below. For example, the process may require fifty separate users express interest in a resource before a resource location may be determined. In general, the larger the number of users who expressed interest in the resource the greater the confidence that the locations of the users are representative of the distribution of the resource. In some implementations, a threshold confidence level can be required before associating a resource with a location. The confidence level can be calculated using conventional means. In some implementations, both a minimum number of users and a minimum confidence level can be required.

In some implementations, the identification of interest is more refined. For example, a user may select a search result by accident. A user may also believe that a search result satisfies the users needs when, in fact, it does not. Generally, in response to selecting an unsatisfactory search result, the user will quickly return to the search page and select another search result, submit another query, or will abandon searching altogether.

In some implementations, the process stores representations of expressions of interest over a period before associating the resource with a location. For example, the process may collect representations for three months before using the representations to determine a location for the resource. In other implementations, the process determines a location to associate with a resource after the resource has received a threshold number of expressions.

In some implementations, the process stores a representation of the location of the user and the resource corresponding to the result in a database. In some implementations, the process stores the representations of the expression of interest and the resource corresponding to the search result if the selection of the result meets certain threshold criteria. For example, when the length of time a user spent viewing a selected resource exceeds a threshold. The process can filter out the expressions with shorter lengths of time. In other implementations, the process weights the location information based on the duration of time the user spends viewing the resource. Longer views are given more weight than shorter views.

The process determines expression locations for the expressions of interest (404). The expression location may be an actual location identified using conventional means, for example an IP Address, GPS coordinates, or a location provided by a cellular provider. The expression location may also be an inferred location, identified by examining the query history of the user prior to expressing interest in the resource. For example, a user who submits the query "dentists in Berkley, Calif." will likely select a result for a dentist in Berkley, Calif. In another scenario, a user who submits several queries targeting a specific location, for example "hotels in Paris", "restaurants in Paris," etc. is likely interested in Paris. In this case, an expression of interest by the user indicates that the resource is relevant to Paris. Accordingly, the expression location is determined to be Paris. In some implementations the expression location is the location of a mobile phone on which the user expresses interest. The location of the mobile phone may be determined based on information identifying the cell tower or towers which receive the transmission from the cell phone. In some implementations, the location of the user is identified in terms of longitude and latitude coordinates. The process can also weight the expression based on a measure of confidence that the determined location of the user reflects an approximate actual location for a user. For example, GPS information provided from a client device may correspond to a high level of confidence that the determined location reflects the approximate actual location for the user. In contrast, a location of a user determined from submitted queries may correspond to a lower level of confidence.

The process determines a resource location based on the expression locations (406). In some implementations, the resource location is based on the spatial distribution of the locations of the users. The resource location is identified by a mean center and a dispersion.

Calculating the Center

The mean center is calculated by calculating the mean longitude and latitude. The mean longitude is calculated according to the formula:

$$\overline{X} = \sum_{i=1}^{N} \frac{X_i}{N}$$

where $\overline{X}$ is the mean longitudinal value, N is the number of expression locations, and $X_i$ is the longitudinal value for the ith expression location.

Similarly, the latitudinal value for the mean center is calculated according to the formula $$\overline{Y} = \sum_{i=1}^{N} \frac{Y_i}{N}$$

where $\overline{Y}$ is the mean latitudinal value, N is the number of expression locations, and $Y_i$ is the latitudinal value for the ith expression location.

The mean center is the point defined by the mean longitudinal value and the mean latitudinal value.

In some implementations, where the expression locations are weighted, for example, where expression locations are weighted based on a length of time of a view associated with the expression, a weighted mean center may be calculated. The weighted mean center is calculated by determining a weighted mean longitude and a weighted mean latitude.

The weighted mean longitudinal value is calculated according to the formula:

$$\overline{X} = \frac{\sum_{i=1}^{N} w_i X_i}{\sum_{i=1}^{N} w_i}$$

where $\overline{X}$ is the weighted mean longitudinal value, N is the number of expression locations, $w_i$ is the weight applied to the ith expression location and $X_i$ is the longitudinal value for the ith expression location.

The weighted mean latitudinal value is calculated according to the formula:

$$\overline{Y} = \frac{\sum_{i=1}^{N} w_i Y_i}{\sum_{i=1}^{N} w_i}$$

where $\overline{Y}$ is the weighted mean latitudinal value, N is the number of expression locations, $w_i$ is the weight applied to the ith expression location and $Y_i$ is the latitudinal value for the ith expression location.

Calculating the Dispersion

In some implementations, the dispersion is a standard deviation of the distance of the expression locations. The standard deviation of the distance is calculated according to the formula:

$$S_{xy} = \sqrt{\sum_{i=1}^{N} \frac{(d_i)^2}{N-1}}$$

where $S_{xy}$ is the standard deviation of the distance, $d_i$ is the distance between the ith point in the set and the mean center and N is the total number of expression locations.

In some implementations, the dispersion may be defined by an ellipse, for example a standard deviation ellipse. The use of an ellipse allows for the possibility that the dispersion is directionally dependent, which may improve accuracy. The standard deviational ellipse is calculated by transposing the expression location coordinates onto a coordinate plane with an origin at the mean center (or weighted mean center), identifying an angle of rotation for the coordinate plane such that one axis represents the short axis of the ellipse, and another axis represents the long axis of the ellipse, and calculating the standard deviation along each axis.

The transposed coordinates for an expression location on to the coordinate plane can be determined according to the formula $$X' = X - \overline{X}, Y' = Y - \overline{Y}$$

where X' is the transposed longitudinal coordinate, X is the longitudinal coordinate, $\overline{X}$ is the longitudinal coordinate of the mean center, Y' is the transposed latitudinal coordinate, Y is the latitudinal coordinate, and $\overline{Y}$ is the latitudinal coordinate of the mean center.

The angle of rotation can be calculated according to the formula:

$$\tan\theta = \frac{\sqrt{(\sum X'^2 - \sum Y'^2)^2 + 4(\sum X'Y')^2}}{2\sum X'Y'}$$

where θ is the angle of rotation, X' is the transposed longitudinal coordinate, and Y' is the transposed latitudinal coordinate.

The standard deviation along the X' axis of the coordinate plane can be calculated according to the formula:

$$\sigma_X = \sqrt{\frac{\sum(X'\cos\theta - Y'\sin\theta)^2}{N}}$$

where $\sigma_X$ is the standard deviation along the X' axis of the ellipse, X' is the transposed longitudinal coordinate, Y' is the transposed latitudinal coordinate, θ is the angle of rotation, and N is the number of expression locations.

Similarly, the standard deviation along the Y' axis of the coordinate plane can be calculated according to the formula.

$$\sigma_Y = \sqrt{\frac{\sum(X'\sin\theta + Y'\cos\theta)^2}{N}}$$

where $\sigma_Y$ is the standard deviation along the Y' axis of the ellipse, X' is the transposed longitudinal coordinate, Y' is the transposed latitudinal coordinate, θ is the angle of rotation, and N is the number of expression locations.

In some implementations, the resource is associated with each postal code that is located within the dispersion. The resource may also be associated with other geopolitical regions, for example, towns, cities, and states.

In some implementations, outliers, i.e., users whose locations are far outside the dispersion, are excluded from the distribution analysis.

In some implementations, the resource dispersion is determined using a covariance $$\text{matrix } S = \begin{bmatrix} s11 & s12 \\ s21 & s22 \end{bmatrix}.$$

where s11 is the variance in the latitude and s22 is the variance in the longitude and s12=s21 is the covariance of the axes. S11, s22, and s12 can be calculated recursively using the standard identity:

$$\cdot \sum (X_i - X_{bar})^2 = \frac{\sum X_i^2 - \sum X^2}{N}$$

In some implementations, the resource dispersion can be adjusted to account for additional users who expressed interest in the resource. For example, in implementations where the resource dispersion is measured using a bivariate normal distribution, the inverse-Wishart distribution can be used as a conjugate prior for estimating the covariance matrix S.

In some implementations, the cumulative variance and covariance of the distance can be estimated according to the formula:

$$S^2 = \frac{\sum (X_i - X_{bar})^2}{N-1} = \frac{\sum X_i^2 - \frac{\sum X_i}{N}}{N-1}$$

where $S^2$ is the variance, $X_i$ is the value for the ith point, $X_{bar}$ is the average value, and N is the number of points.

For, covariance of multiple variables (for example, longitude and latitude), the cumulative covariance can be estimated according to the formula:

$$S_{xy} = \frac{\sum (X_i - X_{bar})(Y_i - Y_{bar})}{N-1} = \frac{\sum X_i Y_i - \sqrt{\frac{\sum X_i}{N} \frac{\sum Y_i}{N}}}{N-1}$$

where $S_{xy}$ is the covariance, Xi is the first variable value for the ith point (e.g. value along the first axis of a plane), $Y_i$ is the second variable value for the ith point (e.g. value along the second axis of the plane), $X_{bar}$ is the mean value of the first variable, $Y_{bar}$ is the mean value of the second variable, and N is the number of points.

Using these formulas, a new point may be added and a new covariance may be calculated without recalculating the entire covariance. For example, the new covariance may be calculated by storing the values for $\Sigma X_i Y_i$, $\Sigma X_i$, $\Sigma Y_i$ and N.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for presenting search results, the method comprising:
    before receiving a search query, associating a search result with a location and a location dispersion by:
        obtaining click data, the click data associating the search result with the logged locations of users who previously selected the search result in a list of search results;
        determining a center of the logged locations;
        associating the center with the search result;
        determining a dispersion area of the logged locations; and
        associating the dispersion area with the search result
    wherein:
        calculating a dispersion area further comprises calculating a dispersion radius from a standard deviation of the logged locations; and
        calculating a center of the logged locations further comprises calculating a mean latitude of the logged locations and a mean longitude of the logged locations;
    receiving the search query and a user location;
    determining, via one or more processors, a search result responsive to the search query,
    wherein the search result is associated with a location and a location dispersion;
    ranking the search result based, at least in part, on the user location, the search result location, and the search result location dispersion, wherein the location dispersion is a statistical dispersion that measure of measures the localization of the search result, wherein the smaller an area of dispersion the more localized the search result and the larger the area of dispersion the less localized the search result;
    presenting the search result according to its rank in a ranked list of search results responsive to the received search query.

2. A method for determining a resource location, the method comprising:
    presenting the resource as a search result responsive to a search query received from a user at a user location;

receiving an indication that the user selected the search result;

determining, via one or more processors, the resource location from the user location and locations of a plurality of other users who selected the search result when the search result was presented in response to a respective plurality of search queries from the other users;

determining a resource location dispersion from the user location and the locations of the plurality of other users;

receiving another search query to which the resource is responsive and another user location;

ranking search results including the resource and responsive to the other query based, at least in part, on the other user location, the resource location, and the resource location dispersion, wherein the resource location dispersion is a statistical dispersion that measures the localization of the search result, wherein the smaller an area of dispersion the more localized the search result and the larger the area of dispersion the less localized the search result;

wherein determining the resource location from the user location comprises excluding from the determination locations of users who requested a different resource less than a threshold amount of time after the resource was presented.

* * * * *